INVENTOR.
Robert R. Grover

INVENTOR.
Robert R. Grover

Aug. 2, 1960 R. R. GROVER 2,947,393
ELECTRIC CLUTCH AND BRAKE
Filed Dec. 26, 1956 4 Sheets-Sheet 4

INVENTOR.
Robert R. Grover

United States Patent Office 2,947,393
Patented Aug. 2, 1960

2,947,393
ELECTRIC CLUTCH AND BRAKE
Robert R. Grover, Swanzey, V. Westport, N.H.
(R.F.D. 1, Winchester, N.H.)
Filed Dec. 26, 1956, Ser. No. 630,611
3 Claims. (Cl. 192—18)

This invention relates to an electric clutch and brake and consists in the combination and arrangement of parts herein described and claimed.

The object of this invention is to produce a unitized form of electric clutch and brake assembly, with means of automatically disengaging a brake prior to engagement of a clutch and at any specified time as the stationary field is de-energized to have the clutch automatically disengage and have the brake applied.

Another object of this invention is to provide an electric clutch and brake unit with components interrelated in such a manner that a single source of actuation will provide a combination clutch and brake assembly with all forces self contained within its unitized form of assembly.

A further object of this invention is to provide a self contained unitized form of an electric clutch and brake assembly that can be assembled and adjusted as a unit prior to installation in a machine of which it will become a part thereof.

A still further object of this invention is to have all axial forces due to cam reaction, self contained within the electric clutch and brake assembly.

The principle of operation of this invention for an electric clutch and brake is one of servo-action. The electro-magnetic means is a stationary field type of electro magnet whose armature disc, along with the outer set of clutch plates, is driven by means of a driving cup, and whose actuator cam is driven with the inner set of plates that are in engagement with the clutch body. At the instant that the stationary field is energized the torque reaction between the actuator cam and armature disc is transferred into an axial movement by means of a ball and cam arrangement. This axial movement acts first on control pins to relieve pressure on the compression spring of the brake disc pack. Further axial movement forces the inner and the outer plates of the clutch disc pack together with sufficient pressure to drive the inner and outer discs together in full couple. De-energization of the stationary field releases magnetic attraction between armature disc and stationary field. Return springs impose thrust on the disc cam causing actuator cam to return to its neutral position, releasing pressure on the clutch disc pack and allowing compression spring to apply sufficient pressure on inner and outer discs of the brake disc pack to frictionally stop rotation of the driven members of the electric clutch and brake unit.

The cam mechanism of this invention is double acting, such that the electric clutch and brake is enabled to operate in either a clockwise or counter-clockwise direction of rotation and therefore may be used for reversing service.

Other objects of this invention will become apparent from a reading of the following specifications taken in conjunction with the drawings in which like symbols designate corresponding parts throughout:

Figure 2:
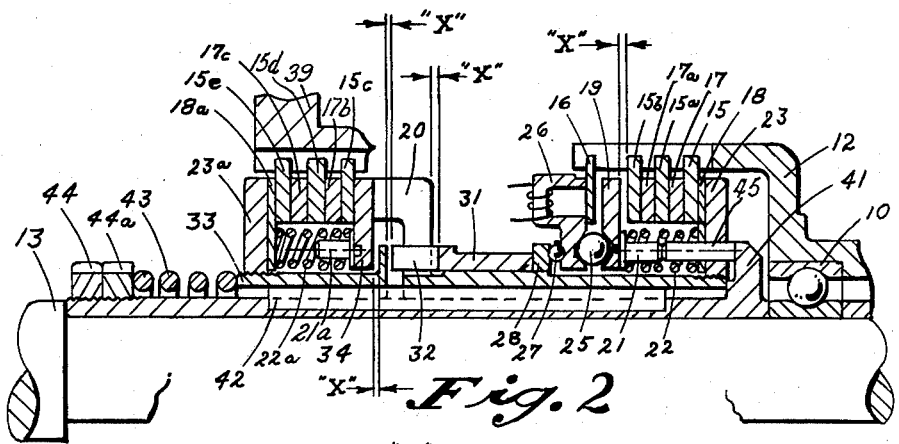
Figures 2–3 and 4 are sectional views of the embodiment of the invention showing a schematic cycle of electric clutch and brake action in which "X" denotes working clearance for adjacent members at specified positions throughout a cycle of operation of the electric clutch and brake unit as follows.

Figure 2 of schematic clutch and brake action: De-energization of stationary field with actuator cam in neutral position and brake fully applied.

Figure 3:
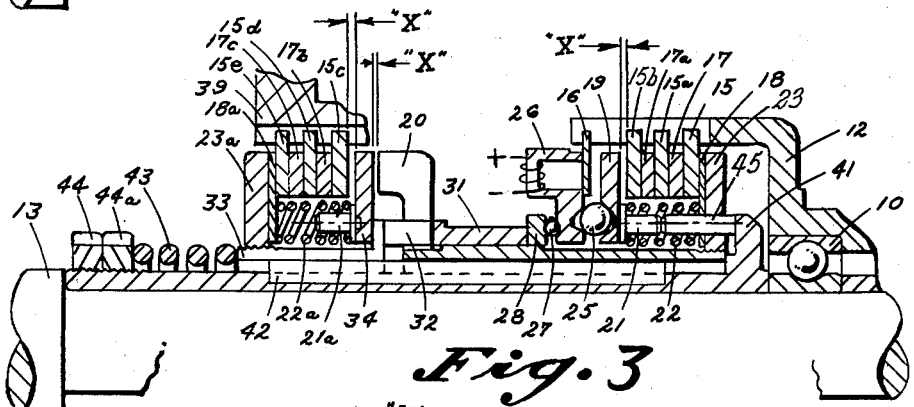

Figure 3 of schematic clutch and brake action: Energization of stationary field causing actuator cam to move in same direction as driving cup with resultant relative motion between actuator cam and disc cam causes axial movement of brake control sleeve to fully relieve pressure on brake disc pack.

Figure 4:
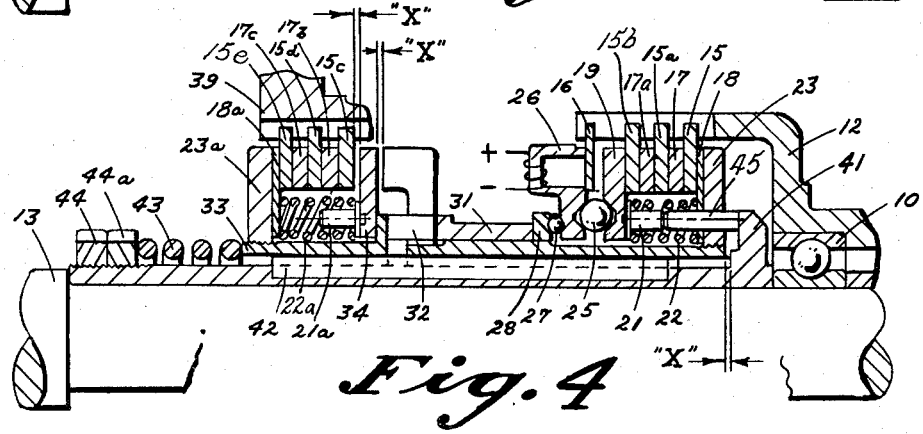

Figure 4 of schematic clutch and brake action: Energization of stationary field causes actuator cam to move in same direction as driving cup. Resultant relative movement between actuator cam and disc cam causes axial movement of brake control sleeve to fully relieve pressure on brake disc pack. Further relative movement between actuator cam and disc cam continues until sufficient pressure to clutch disc pack has been applied to drive the driving cup and clutch disc pack in full couple.

Figure 5:
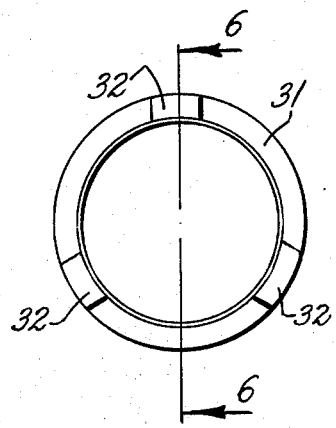

Figure 5 is an elevational view of the brake control sleeve forming a part of this invention.

Figure 6:
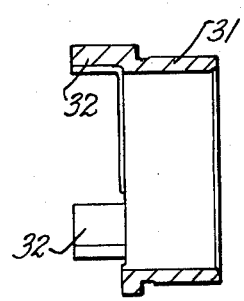

Figure 6 is a sectional view taken along line 6—6 of Figure 5.

Figure 7:
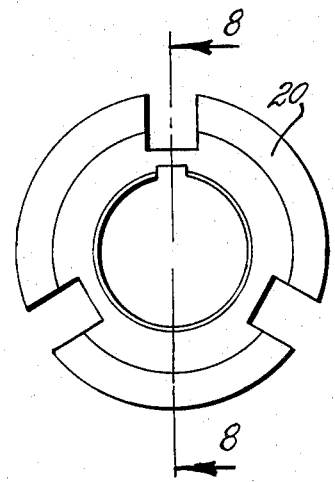

Figure 7 is an elevational view of the clutch body forming a part of this invention.

Figure 8:
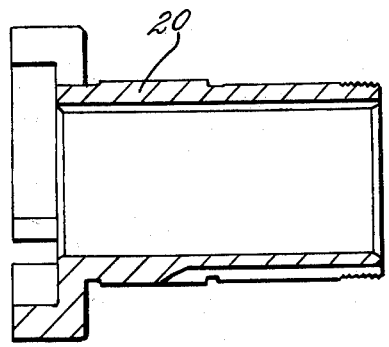

Figure 8 is a sectional view taken along line 8—8 of Figure 7.

Figures 9, 10, 11, 12:
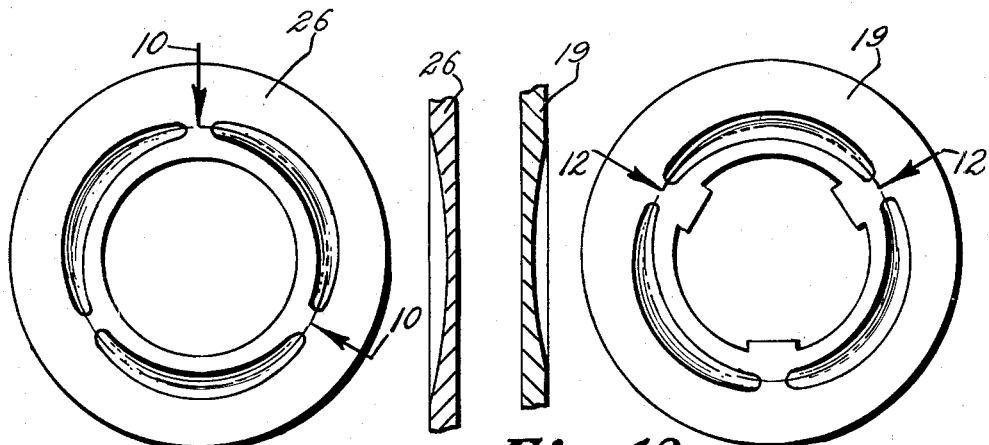

Figure 9 is an elevational view of the actuator cam forming a part of this invention.

Figure 10 is a sectional view taken along line 10—10 of Figure 9.

Figure 11 is an elevational view of the disc cam forming a part of this invention.

Figure 12 is a sectional view taken along line 12—12 of Figure 11 showing configuration of one of the cam surfaces of the disc cam.

Figures 13, 14:
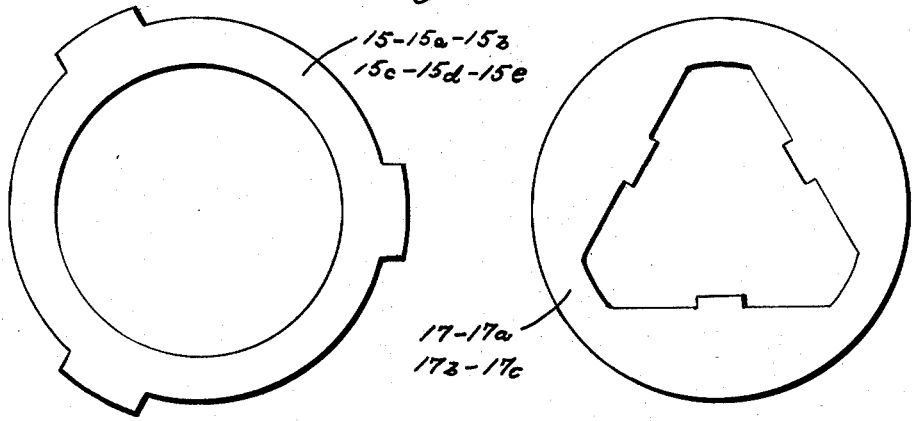

Figure 13 is an elevational view of an outer disc forming a part of this invention.

Figure 14 is an elevational view of an inner disc forming a part of this invention.

Figure 15:
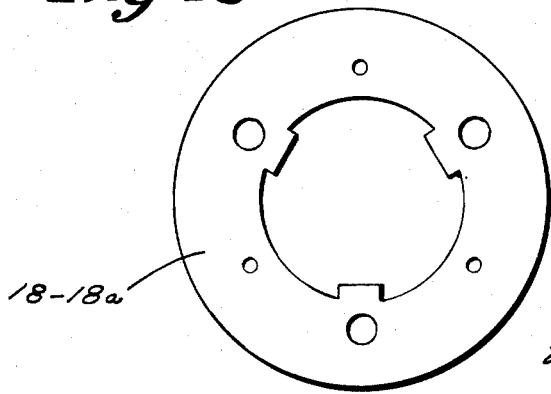

Figure 15 is an elevational view of an end plate forming a part of this invention.

Figure 1:
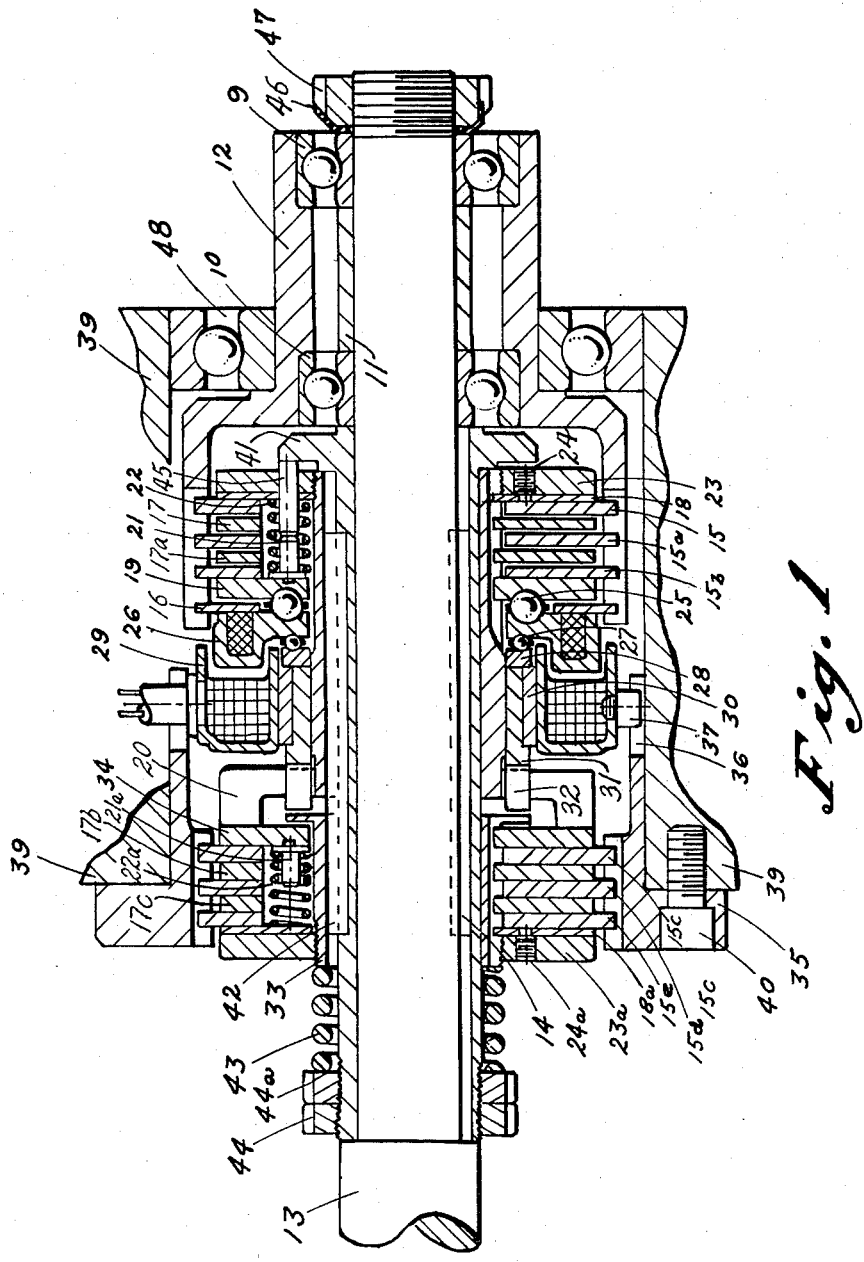
Figure 1 is a vertical sectional view of an embodiment of the invention.

Referring more particularly to the drawings, Figure 1 is a sectional view of the embodiment of the invention in which, anti-friction bearings 9 and 10 and spacer 11 position driving cup 12 on driven shaft 13. Driven shaft 13 has a key and keyway 14 to align its associated members. Driving cup 12 is in positive engagement with lugs on outer discs 15—15a and 15b and armature disc 16. Inner discs 17 and 17a, lock plate 18 and disc cam 19 have inner driving lugs in engagement with clutch body 20. Disc cam 19 has three equally spaced positioning pins 21. These positioning pins are held in position by return springs 22, that in turn impose a thrust on lock plate 18. Lock plate 18 is backed up by end plate 23. Viewing Fig. 8, it will be noted that one end of the clutch body 20 is provided with external threads, and end plate 23 is provided with internal threads so that the end plate 23 is in threaded engagement with clutch body 20 and at assembly is locked in position by two or more lock screws 24. Lock screw 24 has a projecting end to interengage holes in lock plate 18. Preferably three balls 25 are used in the cam mechanism that is comprised of actuator cam 26, disc cam 19 and ball type thrust bearing 27, and thrust bearing race 28. To obtain fine adjustment of the clutch disc pack containing elements 15—15a—15b—17 and 17a, lock screw 24 is unscrewed to back out projecting end thereby unlocking end plate 23. End plate 23 is rotated to a new position and being in threaded engagement with clutch body 20, adjustment of the spacing of the clutch disc pack is readily obtained. Stationary field 29 has an inner bearing 30 of a non-magnetic material that is held stationarily in engagement with stationary field 29 by virtue of a press fit. Inner bearing 30 is free to rotate on brake control sleeve 31 and is positioned axially by thrust bearing race 28. Brake control sleeve 31 is slideably mounted and rotates with clutch body 20. Since the clutch body 20 is not a part of the brake assembly, the coupling of the brake body 33 of the brake assembly to the clutch body 20 is accomplished by providing brake control sleeve 31 with three projecting lugs 32 that project through milled slots in clutch body 20 and perform the function of exerting or releasing forces on brake body 33. Thrust plate 34, inner discs 17b and 17c and lock plate 18a have driving lugs in engagement with brake body 33. Stationary braking cup 35 is in positive engagement with lugs on outer discs 15c—15d and 15e. Stationary braking cup 35 also has an engaging slot 36 for accepting the head of a non-magnetic cap screw 37. Cap screw 37 is threaded into stationary field 29 and performs the function of preventing the rotation of stationary field 29. Stationary brake cup 35 is attached to housing 39 by cap screw 40. Thrust plate 34 has three equally spaced positioning pins 21a. These positioning pins 21a are held in position by return springs 22a. Return springs 22a are mounted between thrust plate 34 and lock plate 18a, and function to impose a thrust force between thrust plate 34 and lock plate 18a to separate elements of the brake disc pack in its unlocked position. End plate 23a is in threaded engagement with brake body 33 and at assembly is locked in position by two or more lock screws 24a. Lock screw 24a has a projecting end to interengage holes in lock plate 18a. To obtain fine adjustment of the brake disc pack containing elements 15c—15d—15e—17b and 17c, lock screw 24a is unscrewed to back out projecting end thereby unlocking end plate 23a. End plate 23a is rotated to a new position and being in threaded engagement with brake body 33, adjustment of the brake disc pack is readily obtained. Brake body 33 is positively keyed to thrust body 41 by key 42. Compression spring 43 is mounted on thrust body 41 and held in position by adjustable nuts 44 and 44a. Adjustable nuts 44 and 44a are in threaded engagement with thrust body 41 and are used to adjust pressure on compression spring 43. Three equally spaced control pins 45 are mounted with their respective axis in line with positioning pins 21. Control pins 45 are allowed to slide axially through spacing holes in lock plate 18 and end plate 23 and are in positive engagement with flange face of thrust body 41 and end face of positioning pin 21. Driven shaft 13 has at its outer end a nut 46 and a lock washer 47. Driving cup 12 is positioned in housing 39 by anti-friction bearing 48.

Although the foregoing description is necessarily of a detailed character, in order to completely set forth the invention it is to be understood that the specific terminology is not restrictive or confining and it is to be further understood that various rearrangement of parts and modification of structural detail, or reversal of elements may be resorted to without departing from the scope or spirit of the invention as herein described and claimed.

What is claimed is:

1. A clutch and brake apparatus, comprising in combination, a stationary housing, a stationary braking cup, driving means including a driving cup, driven means including a driven shaft, a thrust body, a clutch body, a clutch disc pack and a brake body, a brake disc pack mounted on said brake body, brake control means including a brake control sleeve operatively connected to said brake disc pack effecting engagement and disengagement of said brake disc pack, a compression spring operatively connected to said brake disc pack effecting engagement of said brake disc pack, clutch control means including said clutch body and a plurality of control pins, said plurality of control pins being mounted on said thrust body and slidably connected to said clutch body for rotation therewith and operatively connected to said thrust body effecting engagement and disengagement of said clutch disc pack, power operated means including an actuator cam mounted on said clutch body for limited rotation and coaxial with said clutch disc pack, a disc cam mounted in said driving cup for rotation and coaxial with said clutch disc pack, said actuator cam and said disc cam each having a face portion and said face portions confronting each other and each having a plurality of wedge shaped recesses to form pairs of oppositely located recesses, a plurality of balls respectively mounted in the spaces between said pairs of recesses and being supported by said actuator cam and said disc cam, electromagnetic means including an annular electromagnet mounted in coaxial relation with and mounted on said brake control sleeve for free rotation therewith, and an armature disc mounted in said driving cup in coaxial relation with and loosely mounted between said confronting face portions of said actuator cam and said disc cam, and being slidably connected to said driving cup for rotation therewith, said electromagnetic means being operatively engaged with said plurality of balls for moving said actuator cam and said armature disc axially with a greater force than said compression spring effecting axial movement of said brake control sleeve disengaging said brake disc pack and with initial movement of said clutch body to engage said clutch disc pack.

2. A clutch and brake apparatus, combining in combination; a stationary housing, a rotatable driving cup coaxial and rotatably mounted adjacent one end thereof, a stationary braking cup stationarily mounted in said stationary housing, a driven shaft coaxial and rotatably mounted in said stationary housing, a thrust body mounted on said driven shaft for rotation and slideable therewith, a brake body for rotation and axially slideable with said thrust body, a brake disc pack operatively connected to said brake body and said stationary braking cup, a compression spring operatively connected to said brake body effecting engagement of said brake disc pack, a clutch body for rotation and axially slideable with said thrust body, a clutch disc pack operatively connected to said clutch body and said driving cup, a brake control sleeve for rotation and axially slideable with said clutch body, said brake control sleeve operatively connected to said brake body effecting engagement and disengagement of said brake disc pack, an actuator cam mounted on said clutch body for limited rotation and coaxial with said clutch body, a disc cam mounted in said driving cup for rotation and axially slideable with said clutch body, said disc cam and said actuator cam each having a face portion and said face portions confronting each other and each being formed with a plurality of wedge shaped recesses to form pairs of oppositely located recesses, a plurality of balls respectively mounted in the space between said pairs of recesses and being supported by said disc cam and said actuator cam, an armature disc loosely mounted in said driving cup between said face portions of said actuator cam and said disc cam, said armature disc being slidably connected to said driving cup for rotation therewith, a plurality of control pins equally spaced and mounted between said disc cam and a flange face on said thrust body, said plurality of control pins being slidably connected to said clutch disc pack for rotation therewith, electromagnetic means operatively engaged with said plurality of balls for moving the said actuator cam together with said armature disc toward said brake control sleeve to move the latter effecting complete disengagement of said brake disc pack, and moving said clutch body axially with said thrust body to engage said clutch disc pack together in full couple, said electromagnetic means comprising an annular electromagnet mounted in coaxial relation with said brake control sleeve for free rotation therewith and non-rotatively connected and axially slideable in said stationary housing.

3. In an electromagnetically actuated mechanical friction clutch and brake, in which the clutch and brake can be selectively put into and out of operation, a stationary housing, a stationary braking cup fixedly connected to said stationary housing, a driving cup, a driven shaft coaxial with said stationary housing and said driving cup, a thrust body coaxial and slideable with said driven shaft, a brake body coaxial and axially slideable with said thrust body and said brake body having a brake disc pack fixedly connected thereto, a compression spring loosely mounted on said thrust body and operatively connected to said brake body for applying pressure on said brake disc pack, a clutch body coaxial and axially slideable with said thrust body, said clutch body having a clutch disc pack fixedly connected thereto, a brake control sleeve coaxial and slideable with said clutch body and being adapted for alternate axial movement effecting engagement and disengagement of said brake disc pack; an actuator cam mounted on said clutch body for free rotation and coaxial with said clutch body, a disc cam mounted in said driving cup for rotation and axially slideable with said clutch body, said actuator cam and said disc cam each having a surface portion facing each other and said surface portions being formed with three wedge shaped cam recesses, said three wedge shaped cam recesses being in substantial alignment with each other, three balls located in the spaces between said wedge shaped recesses of said actuator cam and said disc cam, an armature disc loosely mounted in said driving cup between said actuator cam and said disc cam, said armature disc having driving lugs in engagement with said driving cup and rotatable therewith, three control pins equally spaced and mounted on said thrust body between said disc cam and a flange face portion on said thrust body and being slideably connected to said clutch disc pack for rotation therewith, electromagnetic means operatively engaged with said three balls for moving said actuator cam together with said armature disc toward said brake control sleeve to move the latter effecting disengagement of said brake disc pack, and said electromagnetic means being operatively engaged with said three control pins to move said clutch body to engage said clutch disc pack and said driving cup together in full couple, said electromagnetic means comprising an annular electromagnet located coaxial with said brake control sleeve for free rotation therewith and non-rotatively connected and axially slideable in said stationary housing.

References Cited in the file of this patent

UNITED STATES PATENTS

| | | |
|---|---|---|
| 2,065,820 | Mellon | Dec. 29, 1936 |
| 2,464,129 | Goettisheim | Mar. 8, 1949 |